United States Patent [19]
Branchetti et al.

[11] Patent Number: 6,055,665
[45] Date of Patent: *Apr. 25, 2000

[54] METHOD FOR RECOVERING FAILED MEMORY DEVICES

[75] Inventors: Maurizio Branchetti, San Paolo D'enza; Armando Conci, Cusano Milanino; Carla Golla, Sesto San Giovanni, all of Italy

[73] Assignee: SGS-Thomson Microelectronics S.r.l., Agrate Brianza, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/816,766

[22] Filed: Mar. 18, 1997

[30] Foreign Application Priority Data

Mar. 21, 1996 [EP] European Pat. Off. .............. 96830136

[51] Int. Cl.$^7$ ...................................................... G06F 11/10
[52] U.S. Cl. ............................ 714/777; 714/766; 714/767
[58] Field of Search ................................ 371/37.03, 40.4, 371/40.1, 38, 13; 714/777, 766, 767

[56] References Cited

U.S. PATENT DOCUMENTS

| | | | |
|---|---|---|---|
| 4,493,081 | 1/1985 | Schmidt | 371/38 |
| 5,012,472 | 4/1991 | Arimoto et al. | 371/40.1 |
| 5,056,089 | 10/1991 | Furuta et al. | 371/3 |
| 5,056,095 | 10/1991 | Horiguchi et al. | 371/40.1 |
| 5,287,311 | 2/1994 | Tso et al. | 365/201 |
| 5,384,789 | 1/1995 | Tomita | 371/40.1 |
| 5,448,578 | 9/1995 | Kim | 371/40.4 |
| 5,592,499 | 1/1997 | Tanoi | 371/40.1 |

FOREIGN PATENT DOCUMENTS

| | | | |
|---|---|---|---|
| 0 448 970 A2 | 2/1991 | European Pat. Off. | G06F 11/10 |
| 0 590 809 A2 | 6/1994 | European Pat. Off. | G06F 11/16 |

*Primary Examiner*—Emmanuel L. Moise
*Assistant Examiner*—Esaw Abraham
*Attorney, Agent, or Firm*—Theodore E. Galanthay; Allen, Dyer, Doppelt, Milbrath & Gilchrist, P.A.

[57] ABSTRACT

The invention relates to a method of recovering faulty non-volatile memories. This method can be applied to an electrically programmable semiconductor non-volatile memory device set up as a multi-sector memory matrix and including selection circuitry for selecting words or individual bytes of the memory. According to this method, the memory matrix is addressed by byte, rather than by memory word, by selection circuitry, whenever the device fails an operation test. The use of a Hamming code for error correction to remedy malfunctions due to manufacture allows the method to be applied to those devices which fail their test and would otherwise be treated as rejects.

15 Claims, 1 Drawing Sheet

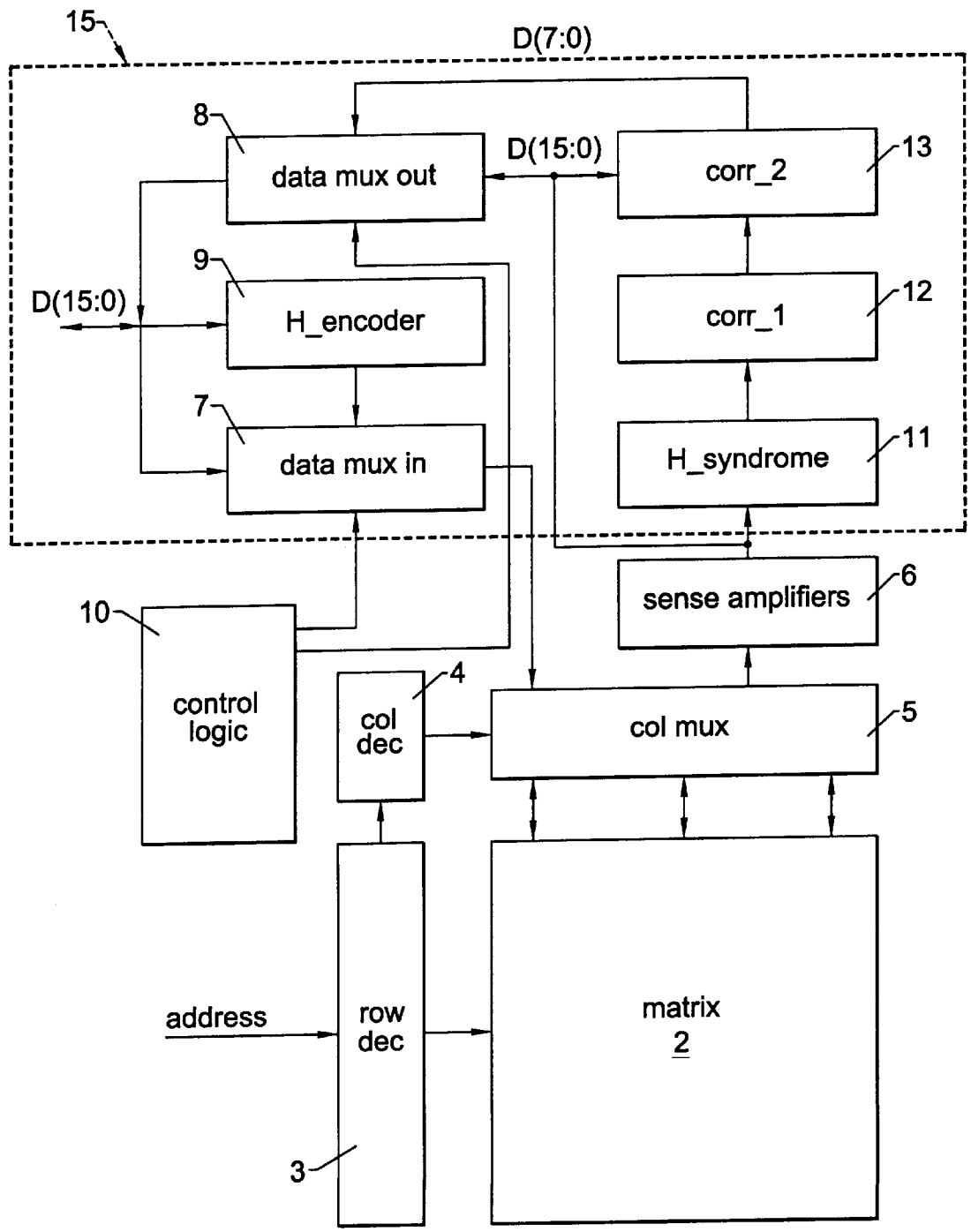

METHOD FOR RECOVERING FAILED MEMORY DEVICES

FIELD OF THE INVENTION

This invention relates to a method of recovering faulty non-volatile memories. More particularly, but not exclusively, the invention concerns such a method as can be applied to an electrically programmable semiconductor non-volatile memory device of the type which is set up as a multi-sector memory matrix and includes selection circuitry for selecting words or individual bytes of the memory. The invention further relates to a non-volatile memory device which can be programmed and erased electrically and comprises a multi-sector memory cell matrix.

BACKGROUND OF THE INVENTION

As is well known, manufacturing yield is a major concern in the high-volume manufacturing of integrated circuit memory devices. A matrix of memory cells often emerges from the manufacturing process in a faulty condition, such that the device will be unsuitable for use. In fact, for the cell matrix taking up most of the device circuit area, the probability of a serious manufacturing fault occurring in the circuit portion occupied by the matrix is quite high. Specifically, in this field of application, the manufacture of non-volatile memory devices of the so-called Flash type shows a comparatively low yield rate.

There have been prior proposals for improving the yield from the manufacturing process of Flash memories. The solution previously adopted provided a circuit-oriented remedy. In essence, the structure of the matrix of memory cells is given additional rows and/or columns, known as redundancy rows/columns, which can be utilized in place of any faulty rows/columns that have developed malfunctions as determined by device testing. The skilled person in the art is familiar with the criteria for designing and utilizing redundancy rows/columns, but is also aware of the limitations of such a circuit-oriented approach.

It is presently expected that continually evolving technology may lead in the near future to processing improvements that will make row redundancy an unnecessary measure. However, no comparable improvements are expected with respect to making column redundancy unnecessary.

As an example, and for an easier understanding of the aspects of this invention, the advantages and drawbacks of column redundancy will be reviewed briefly below, keeping in mind that a primary objective of this technique is to remedy malfunctions brought about by individual cells whose electrical characteristics are different from their design specifications. It is indeed at the designing stage that the ideal number of redundancy columns must be decided upon, as a compromise between the safety level sought and the circuit area increase for the redundancy columns.

It should be considered that most of the circuit feature-size is due to circuitry needed for controlling the inclusion of redundancy columns. Moreover, the size of such control circuitry is bound to increase with the overall size of the memory device. This is explained in that a redundant element must be selected by comparing a memory address outside the device with the contents of a specific internal register whereinto the locations of the columns (or the rows) to be put in exchange are stored.

In the particular instance of Flash memories, wherein the matrix is set up in sectors, column redundancy commands special attention at the design stage. In fact, with the columns being assigned to individual sectors rather than to the device as a whole, it often occurs that: an integrated device must be rejected wherein one sector cannot be repaired due to its supply of redundant elements having been exhausted, while other sectors of the same device may have a surplus of redundant: elements available to them.

SUMMARY OF THE INVENTION

The underlying technical problem of this invention is to provide a method of recovering faulty non-volatile memories, which method can turn memory devices that have shown malfunctions upon testing into properly operating, and hence marketable, products. The method should have features to make the presence or absence of redundant elements inconsequential. This would allow the limitations and drawbacks of prior techniques to be successfully overcome.

The solution on which this invention is based is one of having the memory matrix addressed by the byte, rather than by the word, through the operation of appropriate selection circuitry incorporated into the memory device, in the even, of the device failing the test. Stated otherwise, the solution of this invention includes obtaining the redundant feature from the memory word itself, the stipulation being that only one byte can be used for storing data.

The recovery method of this invention obviously results in a memory device of halved capacity compared to that of the original device. This should, however, be weighed against the fact that the original device is one that has failed its test, and hence a total reject, whereas the issue of the inventive method is a properly operating product.

The features and advantages of the method and device according to the invention will be apparent from the following detailed description of embodiments thereof, given by way of non-limitative examples with reference to the accompanying drawing.

BRIEF DESCRIPTION OF THE DRAWING

FIG. 1 is a block diagram illustrating schematically a non-volatile memory device according to this invention.

DETAILED DESCRIPTION OF THE PREFERRED EMBODIMENTS

Referring to FIG. 1, the structure will be described of a memory device to be recovered by the method of recovering faulty non-volatile memories according to this invention. In fact, the inventive method is particularly, though not exclusively, intended for application to a non-volatile memory device which is programmable and erasable electrically and set up as a memory matrix having multiple sectors and memory words of sixteen bits. However, the principles of this invention could also be applied to memories of thirty-two bits, or for that matter, having memory words which are multiples of one byte (eight bits).

The device 1 is of the monolithically integrated type on a semiconductor, and comprises a matrix 2 of memory cells arranged in rows and columns. The structure of the cell matrix is known per se, and is addressable through a row decoder 3 and a similar column decoder 4. The columns of the matrix 2 are connected bi-directionally to a selector 5 which connects them in communication to a series of sense amplifiers incorporated into a block 6. With a sixteen-bit memory device, sixteen sense amplifiers are needed in order to simultaneously write or read the sixteen bits. Thus far, thee structure of the device 1 may be regarded as quite conventional. The added circuit portions of this invention will be described next. The device 1 includes; a logic unit 10 which contains information concerning the mode of operation and generates suitable enable signals to the other circuit portions of the device. The device 1 further includes a set 15 of error-correcting components, described hereinafter, which are operatively tied to the control unit 10.

In particular, the unit 1 is connected with its output side to a data input selector 7 and a data output selector 8. The input selector 7 operates with sixteen bits and addresses to the matrix 2 memory words which comprise the required bits for correcting in accordance with the inventive method. The selector 7 has outputs connected to the column selector 5.

An encoder 9 is input eight-bit digital data D(7:0) of the least significant byte which correspond to a memory word, and has its output side communicated to the input selector 7 for the latter to receive the digital data D(15:0). The encoder 9 functions to calculate so-called parity bits, as explained hereinafter. Also provided is a calculation block 11 arranged to calculate an "error syndrome". This block 11 is connected after the block 6 that contains the sense amplifiers.

Two cascade-connected correction blocks 12 and 13 are provided after the calculation block 11. The blocks 12 and 13 are arranged to effect a correction of the faulty bits, as explained below. The block 13 is connected to the data output selector 8 to send an eight-bit byte D(7:0) containing the parity bits to the selector 8. Both the correction block 13 and the selector 8 are further input the sixteen-bit output from the sense amplifier block 6. The output selector 8 effects the routing of two bytes to be output.

In the interest of a clearer understanding of the aspects of this invention, the theory of error correction codes will be recalled briefly below. These codes ensure correctness of a digital word by adding a given number of bits, called parity bits, to the information to be safeguarded.

An error correction code known for its unique simplicity and small size is the Hamming code C(7,4), which can be described by a first generating matrix G and a second parity matrix H, as follows:

$$G = \begin{matrix} 1 & 1 & 0 & 1 & 0 & 0 & 0 \\ 0 & 1 & 1 & 0 & 1 & 0 & 0 \\ 1 & 1 & 1 & 0 & 0 & 1 & 0 \\ 1 & 0 & 1 & 0 & 0 & 0 & 1 \end{matrix} \quad (1)$$

and $$H = \begin{matrix} 1 & 0 & 0 & 1 & 0 & 1 & 1 \\ 0 & 1 & 0 & 1 & 1 & 1 & 0 \\ 0 & 0 & 1 & 0 & 1 & 1 & 1 \end{matrix} \quad (2)$$

A correspondence exists between the words of the source alphabet and those of the encoded alphabet; this correspondence is arrived at through an encode operation which can also be represented in chart form, as in the following table:

| Hamming Code C(7,4) | | | | | |
|---|---|---|---|---|---|
| i | source $\overline{u}$ | code $\overline{w}$ | i | source $\overline{u}$ | code $\overline{w}$ |
| 0 | 0000 | 0000000 | 8 | 1000 | 1000101 |
| 1 | 0001 | 0001011 | 9 | 1001 | 1001110 |
| 2 | 0010 | 0010110 | 10 | 1010 | 1010011 |
| 3 | 0011 | 0011101 | 11 | 1011 | 1011000 |
| 4 | 0101 | 0100111 | 12 | 1100 | 1100010 |
| 5 | 0101 | 0101100 | 13 | 1101 | 1101001 |
| 6 | 0110 | 0110001 | 14 | 1110 | 1110100 |
| 7 | 0111 | 0111010 | 15 | 1111 | 1111111 |

A code alphabet is created using the parity bit, i.e. a set of admissible words is formed wherein the minimum Hamming spacing is adapted to allow of correction of any errors which may damage a number of bits smaller than or equal to the corrective capacity of the code. The spacing of the code C(7,4) utilized here is equal to three, meaning that this code is capable of correcting single errors.

Advantageously, the method of this invention employs the Hamming code to remedy any malfunctions in the memory device. For example, for a Flash memory device addressable by sixteen-bit memory words, as is that shown in FIG. 1, it has been determined to obtain the redundancy bits from the memory word itself.

The only stipulation made here is that of using one byte (eight bits) to contain the data, the other byte of the memory word being used for storing the parity bits. In this way, a memory of halved capacity compared to the original one is obviously obtained.

Thus, having decided on the use of a Hamming code C(7,4) which operates with four-bit words, for protecting an eight-bit byte, the byte must be split in two portions, and the six parity bits calculated separately, three for each portion. In this way, one erroneous bit can be corrected for every four adjacent bits associated with the portion.

An exemplary application of the method will now be described. The instance of a 4-Mbyte Flash memory having multiple sectors and a sixteen-bit memory word will be assumed. If this device reveals on testing the inclusion of a sector with more than five faulty columns, then it is a reject, because no sufficient number of redundancy columns are available to permit of its recovery.

But the device can still be recovered using the method of this invention. It will suffice for the purpose that the control unit 10 be programmed for enabling the circuit portions 11, 12, 13, as well as the selectors 7, 8 and the encoder 9. Accordingly, the encoder 9 calculates the parity bits according to the Hamming code, the calculation block 11 evaluating the "syndrome" of the error and activates the blocks 12 and 13 for the correction of faulty bits. The selector 8 routes the two bytes for output, the one containing the corrected byte and the other containing the original sixteen-bit word.

Thus, on completion of the encoding process, the word that is actually stored has sixteen bits, but the eight most significant bits are taken up entirely by the error correction code. All this occurs in a fully transparent manner to the user, who will be denied the ability to drive data into the most significant byte of the memory word, because the encoder block has already determined its value according to that taken by the least significant byte.

If the memory device, thus modified, does pass subsequent tests, it can be regarded as recovered in the form of a 2-Mbyte device capable of operating with eight-bit words. Upon testing, that is when the memory devices are to pass an EWS (Electrical Wafer Sort) test, all those devices which reveal malfunctions are found. The recovery method of this invention will be applied to these and they will be again submitted for testing. For all the integrated memory circuits where the correction arrangement of the invention has been enabled, it will be necessary to specify that the address space is now one-half of the original, and that the width of the memory word is of one byte only.

As for the properly operating devices, the resident control unit 10 of each of them shall have to be programmed for inhibition of the set 15 of error correction blocks. In fact, the inventive method is unsuitable for a properly operating device, and can only be applied to devices that have failed their test and are, on this account, regarded as a total loss.

The invention does solve the technical problem and affords a major advantage. The pin layout in an integrated memory circuit, as recovered in accordance with the invention, corresponds exactly to that of any circuit from the same "family", but with a smaller storage capacity. This feature avoids packaging problems with the devices recovered in accordance with the invention. It should be further considered that space requirements for the additional, error-correcting circuit portion are quite moderate, while the overall integration area taken up by the memory device is only negligibly larger. An accurate estimate gives an added area of just 0.5 mm$^2$. Changes and modifications may be made unto the method and device according to this invention within the scope defined by the appended claims.

We claim:

1. A non-volatile memory integrated device that is programmable and electrically erasable, comprising:
    a multi-sector matrix of memory cells;
    selection circuitry for selecting m-bit or n-bit data words of the matrix of memory cells, said selection circuitry comprising row and column decoder circuits, a column selector, and a sense amplifier block; and
    a control unit and a set of error-correcting components cooperating with the selection circuitry for modifying addressing and output of the matrix of memory cells by m-bit data words when the memory device has failed a reliability test and by n-bit data words when the memory device has passed a reliability test.

2. A memory device according to claim 1, wherein said m-bit data word comprises a data word that is half the number of bits as said n-bit data word.

3. A memory device according to claim 2, wherein said n-bit data word comprises a 16 bit data word and said m-bit data word comprises an 8 bit data word.

4. A memory device according to claim 1, wherein when a memory device has failed a reliability test, said control unit and set of error-correcting components activate error correction codes to halve the addressable space available to a user.

5. A memory device according to claim 1, wherein when a memory device has passed a reliability test, said control unit deactivates said error-correcting components.

6. A memory device according to claim 1, further comprising a data input selector and a data output selector, wherein the data input selector has outputs connected to the column selector, wherein said control unit has an output side connected to both the data input selector and the data output selector.

7. A memory device according to claim 1, wherein said set of error-correcting components includes a calculation block, connected after the sense amplifier block, which is operative to calculate an "error syndrome."

8. A memory device according to claim 7, wherein said set of error-correcting components includes two cascade-connected correction blocks connected after the calculation block for applying a correction to faulty bits in the memory word, a second set of said cascade-connected correction blocks communicating with the data output selector to send a byte containing a corrected byte to said data output selector.

9. A memory device according to claim 1, wherein said memory comprises a Flash memory.

10. A method of recovering a faulty electrically programmable non-volatile memory of a type setup as a multi-sector memory matrix and which includes selection circuitry for selecting m-bit or n-bit data of the matrix of memory cells, the method comprising the steps of addressing the output of the matrix of memory cells by m-bit data words when the memory device has failed a reliability test and by n-bit data words when the memory device has passed a reliability test.

11. A method according to claim 10, and further comprising the step of addressing an m-bit data word that is one-half the number of bits of the n-bit data word.

12. A method according to claim 11, and further comprising the step of activating error correction codes to halve the addressable space available to a user when a memory device has failed a reliability test.

13. A method according to claim 10, wherein the memory comprises a Flash memory.

14. A method according to claim 10, and further comprising the step of using a Hamming code for error correction to remedy malfunctions of the memory.

15. A method according to claim 10, and further comprising the step of obtaining redundancy bits from the memory word itself.

* * * * *